United States Patent
Watanabe et al.

[19]

[11] Patent Number: 5,852,394
[45] Date of Patent: Dec. 22, 1998

[54] ELECTROMAGNETIC COUPLING DEVICE FOR CHARGING AN ELECTRIC MOTOR VEHICLE

[75] Inventors: Kunihiko Watanabe; Shuichi Kanagawa, both of Yokkaichi; Tomohiro Keishi; Shuji Arisaka, both of Osaka, all of Japan

[73] Assignees: Sumitomo Wiring Systems, Ltd.; Sumitomo Electric Industries, Ltd., both of Japan

[21] Appl. No.: 697,363

[22] Filed: Aug. 23, 1996

[30] Foreign Application Priority Data

Oct. 19, 1995 [JP] Japan .................................... 7-297866

[51] Int. Cl.$^6$ .......................... H01F 27/06; H01R 13/44; H01M 10/44
[52] U.S. Cl. ............................. 336/66; 439/138; 439/142; 320/2
[58] Field of Search ................................. 336/66; 320/2; 439/138, 142

[56] References Cited

U.S. PATENT DOCUMENTS

| | | |
|---|---|---|
| 5,216,402 | 6/1993 | Carosa . |
| 5,408,209 | 4/1995 | Tanzer et al. . |
| 5,413,493 | 5/1995 | Hoffman .................................... 320/2 |
| 5,463,303 | 10/1995 | Hall et al. ............................... 336/183 |
| 5,580,258 | 12/1996 | Wakata .................................... 439/142 |
| 5,606,237 | 2/1997 | Biasotti et al. ............................ 320/2 |
| 5,627,448 | 5/1997 | Okada et al. ............................... 320/2 |
| 5,637,977 | 6/1997 | Saito et al. ................................. 320/2 |

*Primary Examiner*—Michael L. Gellner
*Assistant Examiner*—Anh Mai
*Attorney, Agent, or Firm*—Jordan B. Bierman; Bierman, Muserlian and Lucas

[57] ABSTRACT

An electromagnetic coupling device for charging an electric motor vehicle is provided which is easy for handling a charging coupler and hardly lowers electric power transmission efficiency for a long period of time. A charging coupler (10) containing a primary coil (15) is provided with a pair of heat-shielding covers (16), which are pivotably mounted on the coupler (10) by pins (17). When the charging coupler (10) is inserted into a depression (31) in an incoming unit of the electric motor vehicle, guides (21) push lower ends (16a) of the covers (16) to open the covers (16). The primary coil (15) in the charging coupler (10) is electromagnetically coupled to a pair of secondary coils (32, 32) in the depression (31). After charging, when the charging coupler (10) is drawn out of the depression (31), the heat-shielding covers (16) are closed by tension coil springs (18), thereby protecting the primary coil (15) and preventing a person from carelessly touching it.

8 Claims, 6 Drawing Sheets

ELECTROMAGNETIC COUPLING DEVICE FOR CHARGING AN ELECTRIC MOTOR VEHICLE

BACKGROUND OF THE INVENTION (1) Field of the Invention

This invention relates to an electromagnetic coupling device for charging a power source for driving an electric motor vehicle; more particularly, it relates to an electromagnetic coupling device for charging an electric motor vehicle by utilizing an electromagnetic induction manner.

(2) Statement of the Prior Art

Recently, an electromagnetic induction has been proposed as a method of charging a power source for use of driving power in an electric motor vehicle. An example of such a charging method is described below with reference to FIGS. 5 to 7, for convenience of explanation. FIG. 5 is an explanatory view of a common charging system. FIG. 6 is a plan view of an incoming unit provided in a car body. FIG. 7 is a perspective view of a conventional supplying unit.

As shown in FIG. 5, an electric motor vehicle 1 is provided on its car body with an incoming unit 2 connected to a battery used for the driving power of an electric vehicle (not shown). The incoming unit 2 includes secondary coils 4 provided around a depression 3 in the electric motor vehicle 1, as shown in FIG. 6. A supplying unit 5 shown in FIG. 5 is inserted into the depression 3. The supplying unit 5 is connected through a cable 7 to a charging power source 6.

As shown in FIG. 7, the supplying unit 5 includes a primary coil 8 which is contained in, for example, a resin casing 9. When the supplying unit 5 is inserted into the depression 3, the primary coil 8 is electromagnetically coupled to the secondary coils 4, thereby supplying an electric power to a battery for driving power through the supplying unit 5 and incoming unit 2 from the charging power source 6 (FIG. 5).

In order to shorten a charging time in the electric motor as much as possible, a substantial amount of electric power is supplied to the driving power battery. Consequently, a density of electric power to be transmitted from the primary coil 8 to the secondary coils 4 will be high and heat generated from both coils 8 and 4 will be the greatest.

However, since the size of the incoming unit 2 and supplying unit 5 is made as compact as possible, the casing 9 easily raises the temperature on account of heat from, in particular, the primary coil 8. This makes it hard to handle the supplying unit 5.

Moreover, since the casing 9 is made of mainly a synthetic resin material, the casing is easily subject to scratches on the surface. Such scratches on the surfaces of the casing 9 form many small surface irregularities and result in increase of air gaps between the primary coil 8 and the secondary coils 4. This results in the problem of lowering the transmission efficiency of electric power between both coils 8 and 4.

SUMMARY OF THE INVENTION

Accordingly, a main object of the present invention is to provide an electromagnetic coupling device for charging an electric motor vehicle in which a supplying unit can be easily handled and the lowering of transmission efficiency of electric power is prevented.

Another object of the present invention is to provide an electromagnetic coupling device for charging an electric motor vehicle which can make it easy to insert and draw a supplying unit in and out of an incoming unit.

In order to achieve the above objects, an electromagnetic coupling device for charging an electric motor vehicle in accordance with the present invention, comprises: an incoming unit containing at least one secondary coil provided near a depression formed in the electric motor vehicle; a supplying unit containing a primary coil which is electromagnetically coupled to the secondary coil when inserted in the depression; at least one heat-shielding cover for covering at least one of opposite side surfaces of a casing which contains the primary coil; and means for pivotably mounting the heat-shielding cover on the supplying unit.

According to the above structure, even if the surface temperature of primary coil and casing is raised, it is easy for a person to handle the supplying unit since the surface of the casing is enclosed by the heat-shielding cover.

The casing is hardly subject to scratches on its surface and hardly any air-gaps are formed since the casing is protected by the heat-shielding cover. Consequently, it is possible to maintain the coupling of both coils in a good condition and to prevent a lowering of the transmission efficiency of electric power for a long period of time.

If a lid such as a cap is provided on the supplying unit instead of the heat-shielding cover, it will be necessary to detach the cap from the supplying unit upon inserting the supplying unit into the incoming unit. The cap will sometimes be left detached from the supplying unit after the supplying unit is drawn out of the incoming unit. On the contrary, since the heat-shielding cover in the present invention is pivotably attached to the supplying unit, the heat-shielding cover will not be left detached from the supplying unit.

The electromagnetic coupling device of the present invention may further comprise a mechanism which brings the heat-shielding cover into an open position, in which the cover moves away from the primary coil, from a closed position in which the cover protects the primary coil, when the primary coil is inserted into the depression in the coming unit.

This structure enables a person to reduce the labor in connection with the opening of the heat-shielding cover prior to inserting the supplying unit into the incoming unit, thereby simplifying an inserting operation.

The mechanism includes a handle provided on the supplying unit, hinges for pivotably mounting the heat-shielding cover on the casing at a position nearer to the handle than the primary coil, and guides provided on a body surface near the depression in the electric motor vehicle for turning the cover around the hinges in a direction away from the primary coil when the guides receive an insertion force in an inserting direction of the supplying unit.

In the above structure of the present invention, the heat-shielding cover is moved from the open position to the closed position in connection with the drawing operation of the primary coil in the supplying unit out of the depression in the incoming unit.

Since the labor of closing the cover, after the supplying unit is drawn out of the incoming unit, can be reduced, the cover can enhance protection of the supplying unit and simplify the drawing operation.

The supplying unit may be provided with means for biasing the heat-shielding cover in a closing direction, whereby the cover is brought into the closed position from the open position when the supplying unit is drawn out of the depression in the incoming unit.

DETAILED DESCRIPTION OF THE PREFERRED EMBODIMENTS

Referring now to FIGS. 1 to 4, an embodiment of an electromagnetic coupling device for charging an electric motor vehicle in accordance with the present invention will be described below.

Figure 1:
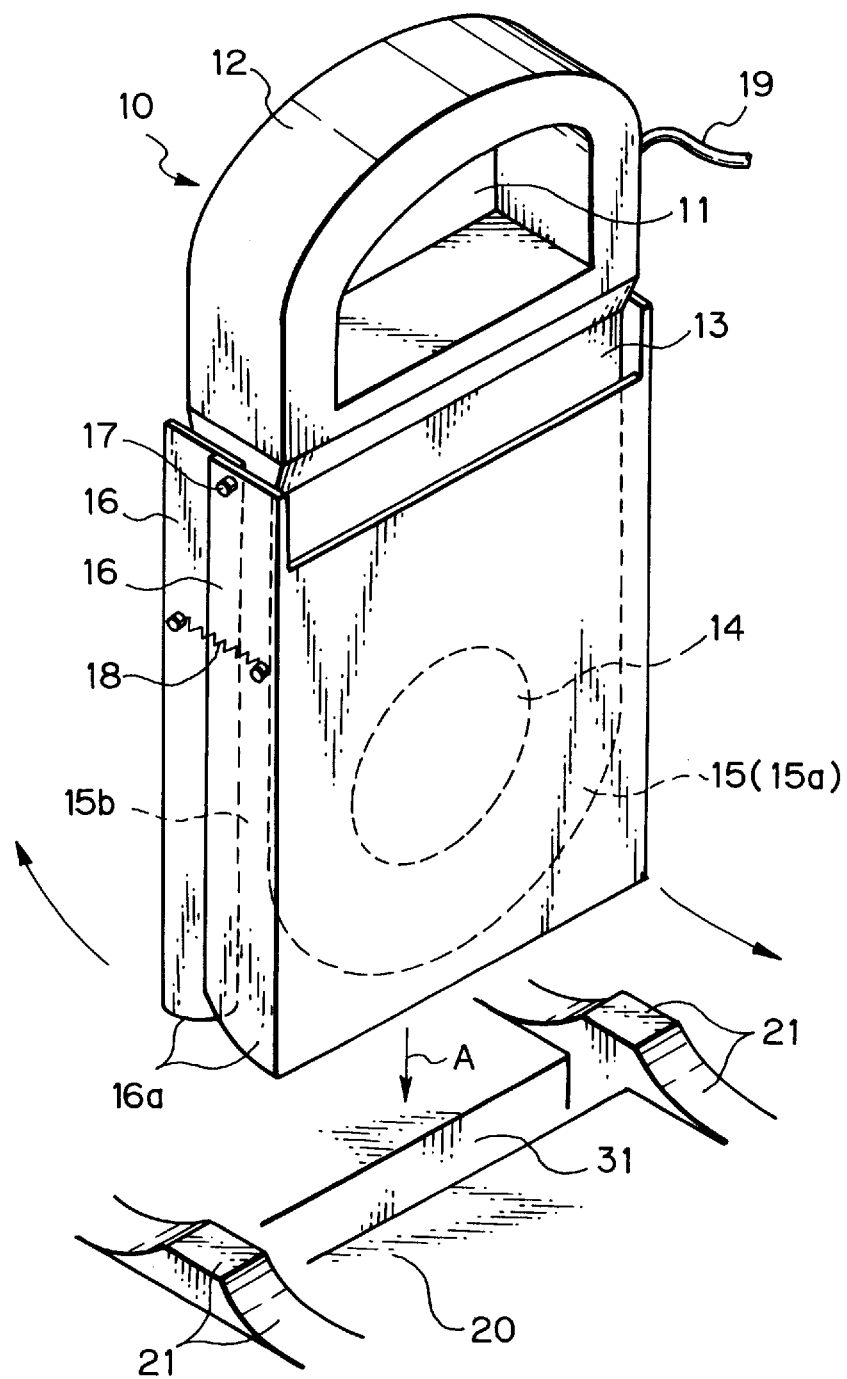
FIG. 1 is a schematic perspective view of an embodiment of an electromagnetic coupling device for charging an electric motor vehicle.

As shown in FIG. 1, a charging coupler 10, which corresponds to a supplying unit, is portable and is provided on the upper end with a through-hole 11 which can receive fingers of an operator. Thus, the upper end constitutes a handle 12. The coupler 10 is provided with a casing 13 below the through-hole 11. The casing 13 contains a cylindrical core 14 and a primary coil 15 wound about the core 14 shown by broken lines in FIG. 1. The primary coil 15 is connected to a charging power source through a cable 19 and a power source circuit not shown.

A pair of heat-shielding covers 16 are pivotably attached to the charging coupler 10 at hinge pins 17 between the primary coil 15 and the handle 12. Thus, the covers 16 can move between an open and closed position relative to the casing 13. The heat-shielding cover 16 may be made of various kinds of materials such as synthetic resin, metal, synthetic leather coated materials, or the like. The covers 16 are mounted on the outside of the casing 13 so as to cover the opposite side surfaces 15a, 15a of the primary coil 15. A pair of recovery springs 18, 18 such as a coil tension spring are bridged between a pair of heat-shielding covers 16, 16. The recovery springs 18 bias the covers 16 in the closing direction. The pair of heat-shielding covers 16, 16 are disposed in symmetry to the imaginary center plane between the side surfaces 15a, 15a of the primary coil 15. Each cover 16 is formed into a U-shape in cross section so as to cover the front and side surfaces 15a and 15b of the primary coil 15.

On the other hand, a car body 20 of the electric motor vehicle is provided with a deep groove-like depression 31. At least one secondary coil 32 (a pair of coils 32, 32 in the shown embodiment) is disposed near each side wall of the depression 31 to form an incoming unit 30, as shown by broken lines in FIG. 2. Each secondary coil 32 is wound around, for example, a center leg portion 33a of an E-shape core 33 and is connected through a charging circuit 40 to a power battery 41.

As shown in FIG. 1, guide projections 21, 21 are provided on the surface of the car body 20 near the depression 31.

Figure 2:
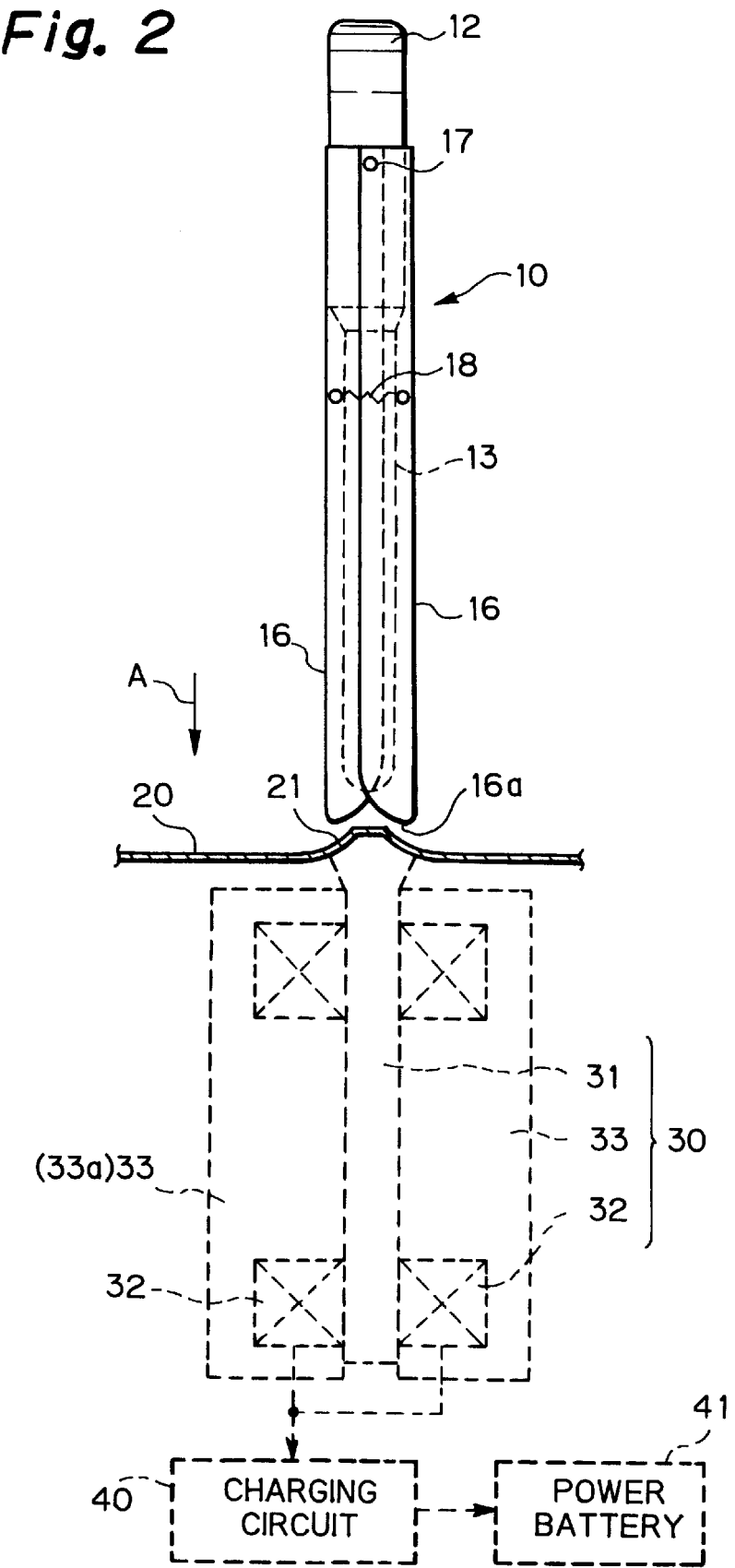
FIG. 2 is a schematic side elevational view of the electromagnetic coupling device shown in FIG. 1, illustrating a supplying unit in a position prior to being inserted into an incoming unit.
Figure 3:
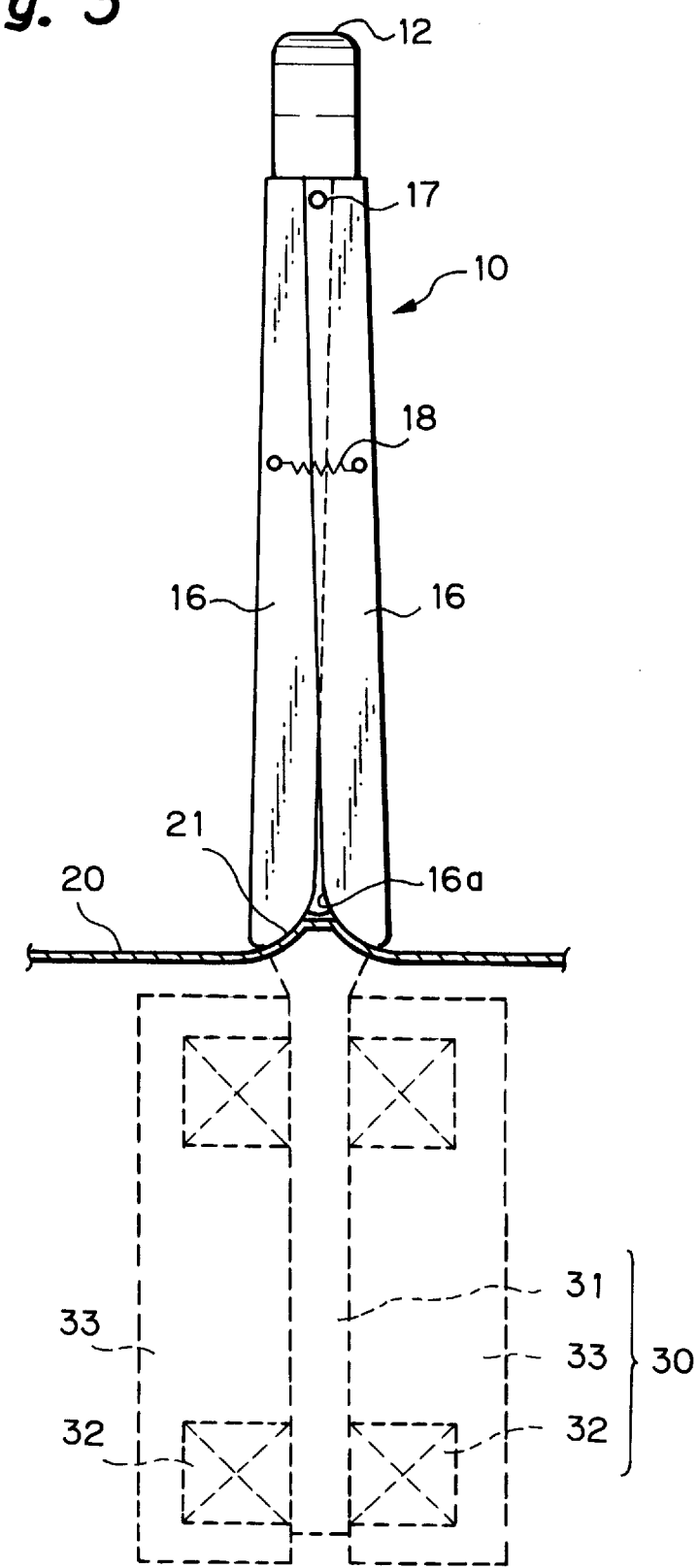
FIG. 3 is a schematic side elevational view of the electromagnetic coupling device shown in FIG. 1, illustrating the supply unit in a position upon commencement of the insertion.

When the guide projections 21, 21 receive an insertion force in an inserting direction of the charging coupler 10 shown in FIG. 2, each guide projection 21 pushes a lower end 16a of each heat-shielding cover 16 so that the heat-shielding cover 16 turns about the pin 17 in a direction away from the primary coil 15 and toward the handle 12, as shown in FIG. 3.

Next, a process of charging operation will be described below.

Figure 4:
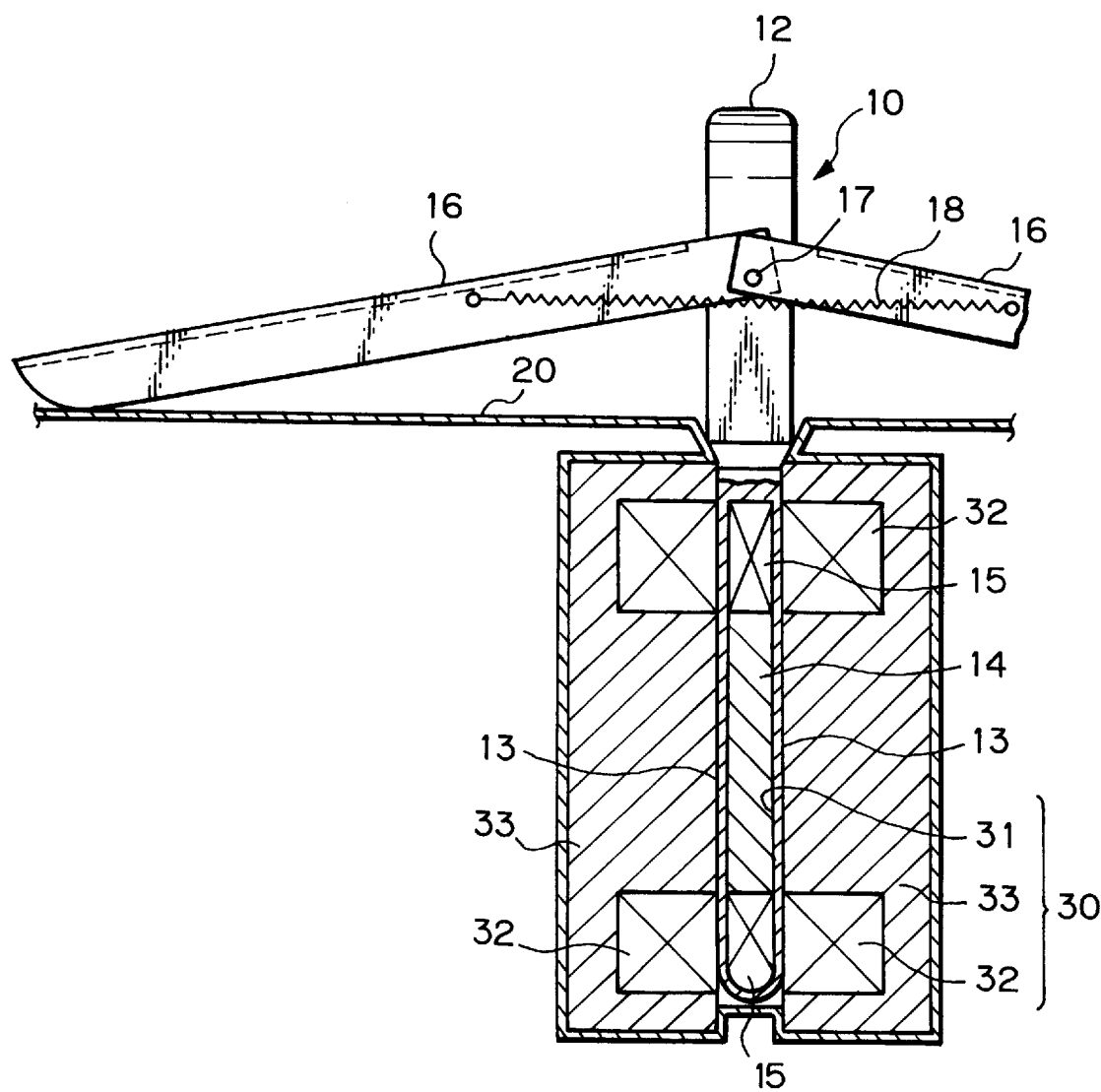
FIG. 4 is a schematic side elevational view of the electromagnetic coupling device shown in FIG. 1, illustrating the supplying unit in a position of completion of the insertion.
Figure 5:
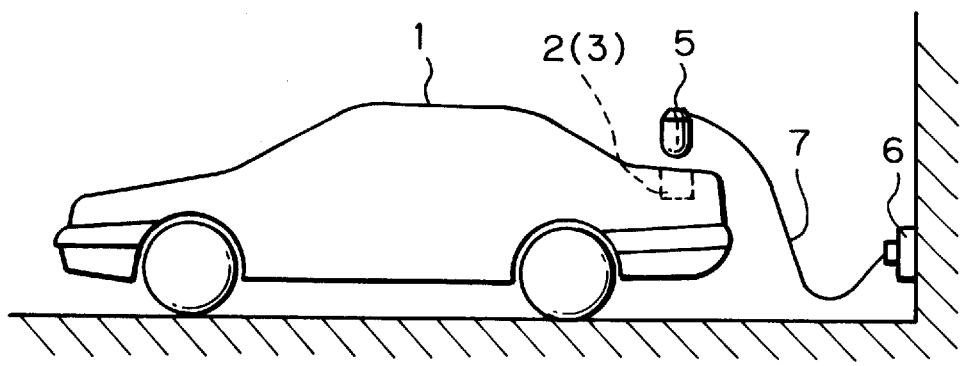
FIG. 5 is an explanatory view of a common charging system.
Figure 6:
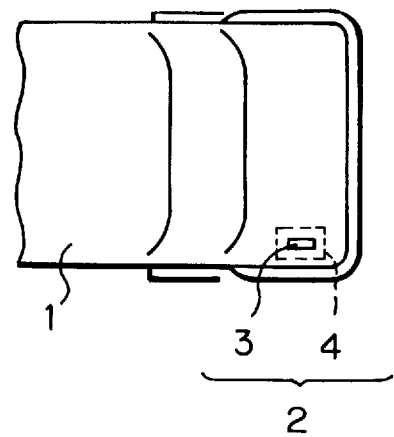
FIG. 6 is a plan view of an incoming unit of a conventional electromagnetic coupling device provided in an electric motor vehicle.
Figure 7:
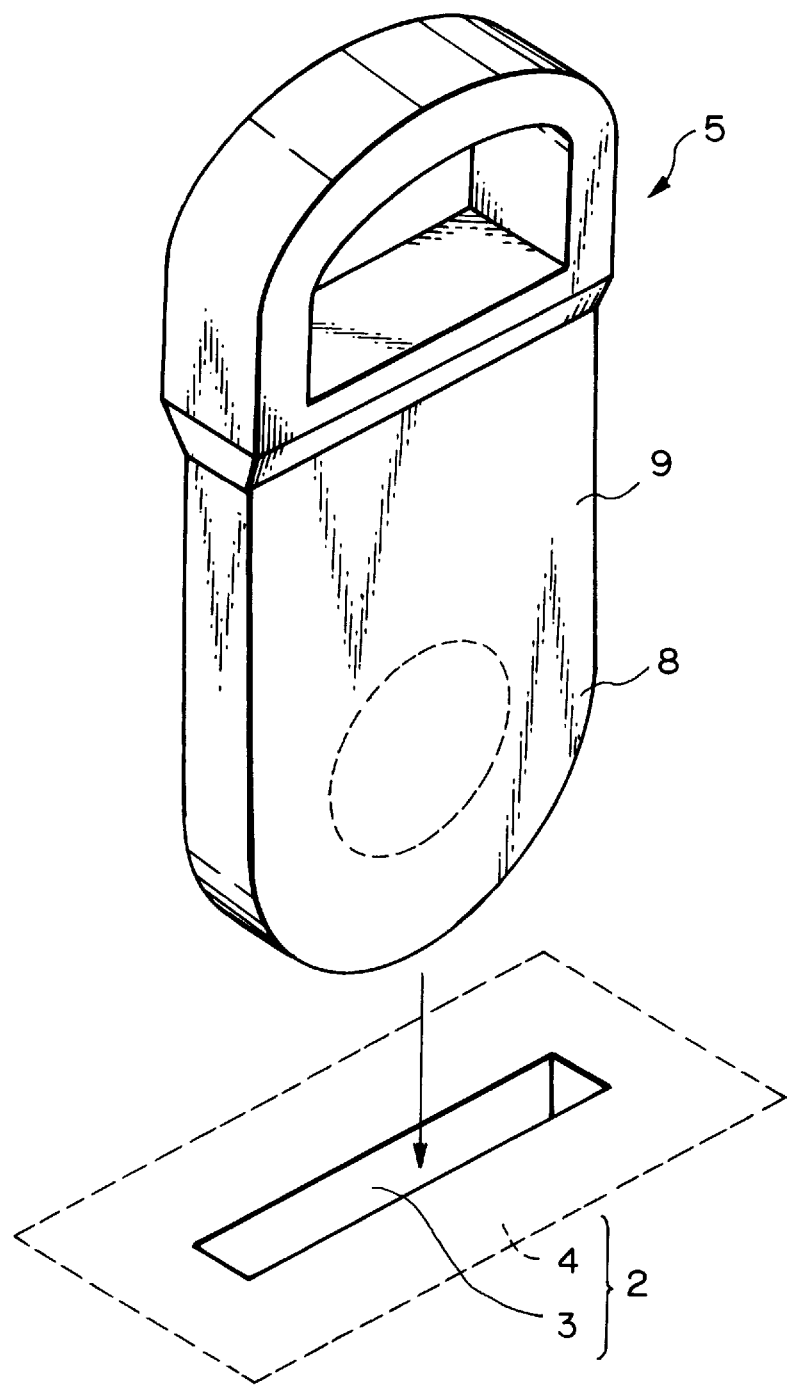
FIG. 7 is a perspective view of a supplying unit in the conventional electromagnetic coupling device.

When the charging coupler 10 is brought near to the inlet of the depression 31 of the incoming unit 30, the lower ends 16a, 16a of the heat-shielding covers 16, 16 come into contact with the guide projections 21, 21 and the covers 16 move to the open position about the pins 17, as shown in FIG. 3. When the charging coupler 10 is inserted into the depression 31 from the position shown in FIG. 3 to the position shown in FIG. 4, the heat-shielding cover 16 moves on the surface of the car body 20 from a position in which the primary coil is enclosed 15 (FIG. 1) to a position in which it is exposed (FIG. 4).

When both coils 15 and 32 are coaxially opposed to each other, a sensor not shown detects a condition in which both coils 15 and 32 can be electromagnetically coupled to each other, a high frequency current (for example, 80 to 150 kHz) is applied to the primary coil 15, a voltage (for example, 100 to 400 V) is generated in the secondary coils 32 by means of electromagnetic induction, and the power battery is charged through the charging circuit (for example, 100 to 400 V, 30 to 10 A). After charging, when the charging coupler 10 is being drawn out of the depression 31, both heat-shielding covers 16 are displaced from their open positions shown in FIG. 3 to their closed positions shown in FIG. 2 by means of the spring recovery force exerted in the tension coil spring 18.

Accordingly, it is easy to handle the charging coupler 10, since the primary coil 15 is enclosed at its side surfaces 15a, 15b by the heat-shielding covers 16, 16, even if the primary coil 15 generates a high temperature (for example, 60° to 80° C.) due to charging. When the charging is not effected, since the surface of the casing 13 is enclosed by the heat-shielding covers, the casing 13 is hardly scratched on the surface by the other elements and both coils 15 and 32 (FIG. 2) are maintained in a good coupling condition, thereby preventing a lowering of a transmission efficiency of electric power for a long period of time.

Also, since the heat-shielding covers are opened in association with an inserting operation of the charging coupler 10, it is not necessary to open the heat-shielding covers before insertion, thereby simplifying the inserting operation. On the other hand, since the heat-shielding covers 16 are closed in association with a drawing-out operation of the charging coupler 10, it is not necessary to close the covers 16 after completion of the charging, a protection of the covers 16 can be surely enhanced, thereby simplifying the drawing-out operation of the charging coupler 10.

Other Embodiments

It should be noted that the present invention is not limited to the above embodiments and the following alterations can be included in the present invention.

(1) Although the above embodiments include a pair of heat-shielding covers 16, only one heat-shielding cover may be provided. Also, although the heat-shielding covers 16 are formed into the U-shapes in cross section in the above embodiments, the heat-shielding cover may be formed into a plate to cover at least one side surface of the primary coil 15. The heat-shielding cover 16 may be provided with a net on a portion which shields the core 14 and primary coil 15, so as to enhance a heat radiation effect.

(2) Although the tension coil spring 18 is used as biasing means in the above embodiments, the heat-shielding cover 16 may be recovered by its own weight without using the tension coil spring. In this case, it is preferable to reduce a resistance around the pins 17. The heat-shielding cover 16 may be provided on its lower end with a permanent magnate with a low magnetism which, assisted by gravity, holds down the cover 16 in the closed position.

(3) Although the heat-shielding covers 16 are opened in connection with the inserting operation of the charging coupler 10 in the above embodiments, the covers 16 may be opened by a cam mechanism and a trigger provided in the casing 13 and handle 12 of the charging coupler 10.

(4) Although the heat-shielding covers 16 are turned about the pins 17 in the above embodiments, the covers 16 may be rotated by hinges. Also, the covers 16 may slide on the coupler 10 without using any pins or hinges.

(5) The depression 31 in the incoming unit 30 may be provided on a front, rear, or side surface of the car body 20 as well as on an upper surface of the car body 20.

What is claimed is:

1. An electromagnetic coupling device for connecting a source of electricity with a receiver, an incoming unit containing at least one secondary coil near a depression in said receiver, a supplying unit having a primary coil in a casing therefor, said primary coil adapted to be electromagnetically coupled to said secondary coil when said primary coil is introduced into said depression in an insertion direction, said supplying unit having a leading end in said insertion direction and a trailing end remote from said leading end, a first cover pivotally mounted on a first side of said supplying unit at a point between said leading end and said trailing end and rotatable in a plane perpendicular to said insertion direction between a protecting position, wherein said first cover overlies said first side of said primary coil, and an open position wherein said first cover is rotated about said point so that one end thereof is spaced apart from said primary coil, said first cover being urged into said open position from said protecting position by insertion of said primary coil into said depression, a second cover pivotally mounted on a second side, opposite said first side, of said primary coil at said point and rotatable in said plane between said protecting position and said opening position, said second cover being urged into said open position from said protecting position by insertion of said primary coil into said depression, at least one guide on said receiver adjacent said depression, said guide adapted to contact said first cover and said second cover, whereby said first cover and said second cover are moved from said protecting position to said open position as said supply unit enters said depression.

2. The coupling device of claim 1 comprising a handle on said supplying unit remote from said leading end, said point being nearer said handle than said leading end.

3. The coupling device of claim 1 wherein there is provided a hinge at said point about which said first cover and said second cover rotate.

4. The coupling device of claim 1 wherein said receiver is an electric motor vehicle.

5. The coupling device of claim 1 wherein said guide comprises a central projection adapted to contact said first cover and said second cover at said leading end, sections on either side of said central projection, said sections sloping in a direction perpendicular to said insertion direction.

6. The coupling device of claim 1 wherein there are two guides, one adjacent each end of said depression.

7. The coupling device of claim 1 wherein said first cover and said second cover are biased toward said protecting position.

8. The coupling device of claim 7 wherein said first cover and said second cover are biased toward each other by a tension spring.

* * * * *